Dec. 8, 1970    G. A. VAN RIEMSDIJK    3,546,569
ROTATABLE TAP CHANGER WITH BRIDGING IMPEDANCES
Filed June 16, 1969    9 Sheets-Sheet 1

INVENTOR
GERARDUS A. VAN RIEMSDIJK

BY *Smiley & Smiley*

ATTORNEYS

Dec. 8, 1970    G. A. VAN RIEMSDIJK    3,546,569
ROTATABLE TAP CHANGER WITH BRIDGING IMPEDANCES
Filed June 16, 1969    9 Sheets-Sheet 3

INVENTOR
GERARDUS A. VAN RIEMSDIJK

BY *Imirie & Smiley*

ATTORNEYS

Dec. 8, 1970  G. A. VAN RIEMSDIJK  3,546,569
ROTATABLE TAP CHANGER WITH BRIDGING IMPEDANCES
Filed June 16, 1969  9 Sheets-Sheet 1

INVENTOR
GERARDUS A. VAN RIEMSDIJK

BY *Imirie + Smiley*

ATTORNEYS

United States Patent Office 3,546,569
Patented Dec. 8, 1970

3,546,569
ROTATABLE TAP CHANGER WITH BRIDGING IMPEDANCES
Gerardus A. van Riemsdijk, Nijmegen, Netherlands, assignor to Smit Nijmegen Electrotechnische Fabrieken, Nijmegen, Groenestraat, Netherlands, a company of the Netherlands
Filed June 16, 1969, Ser. No. 833,256
Claims priority, application Netherlands, June 20, 1968, 6808657
Int. Cl. H01h 19/58
U.S. Cl. 323—43.5     5 Claims

ABSTRACT OF THE DISCLOSURE

A tap changer for regulating a transformer which eliminates the need to frequently switch on and off a large power and the mechanical wear and the time loss resulting therefrom, by providing the tap changer with two selector switches, each having fixed and rotatable switching contacts, the rotatable contacts of both selector switches being mechanically positively coupled with each other and electrically connected to each other in a special way.

---

The invention relates to a composite tap changer for a regulating transformer, said tap changer comprising at least two switches, of which one is a selector switch operating under load conditions and provided with a series of fixed contacts which are positioned with their contact surfaces in a cylindrical surface and are evenly distributed over a portion of the circumference circle of said cylindrical surface only, said fixed contacts being adapted to be connected with the tappings of a winding of said transformer, and at least two switching contacts which are mounted for rotation about the axis of said cylindrical surface and are mechanically fixed to one another, one of said switching contacts being connected substantially without any resistance and the other one thereof being connected through a bridging impedance with a point of junction adapted to be connected with a network or star point conductor which has to be connected to the tappings of said winding, said rotatable switching contacts being adapted to be rotated continuously in either direction of rotation and being positioned at such an angular distance from each other that, during their rotation past the series of fixed contacts, said switching contacts make and break contact with said fixed contacts one after the other and interconnect each time two consecutive fixed contacts temporarily through said bridging impedance, but, during their continued rotation from the last to the first fixed contact of said series, said switching contacts are simultaneously temporarily out of cooperation with a fixed contact.

Tap changers of this kind are able to move on from the highest to the lowest and from the lowest to the highest value of the regulating range. However, in known tap changers of this type the transformer has to be made dead during this continued switching, to which end a separate switch is required, which, when a transformer and such a tap changer are used for industrial purposes, e.g. for electrode- or resistance-furnaces, has to switch on and off a large power many times daily, which is associated with heavy wear and much loss of time.

The invention has the object to provide such a tap changer adapted to be moved on in either direction which is able to continue its switching operation on load in both directions between the extreme values of the regulating range either directly or via one or more intermediate steps, so that the transformer may be kept alive. The invention consists in that the second switch is a selector switch of the same type as the first mentioned selector switch, the rotatable switching contacts of said second switch being mechanically positively coupled with the rotatable switching contacts of the first selector switch and cooperating with a second bridging impedance, the point of junction of the rotatable switching contacts of said second selector switch being electrically conductively connected with the point of junction of the rotatable switching contacts of the first selector switch, the first and the last contact of the series of fixed contacts of said second selector switch, seen in a direction of rotation of its rotatable switching contacts, being electrically conductively connected with the last and the first contact of the series of fixed contacts of the first selector switch, respectively, seen in the corresponding direction of rotation of the rotatable switching contacts of said first selector switch and the fixed and the rotatable contacts of the two selector switches being so arranged in relation to each other as to ensure that the transition of the connection to be established between said points of junction and a fixed contact from a fixed contact to the next fixed contact is exclusively carried out by the rotatable switching contacts and the bridging impedance of the first selector switch, when the rotatable switching contacts of said first selector switch rotate from the first to the last fixed contact of said selector switch, and is exclusively carried out by the rotatable switching contacts and the bridging impedance of the second selector switch when the rotatable contacts of the first selector switch continue to rotate from the last to the first fixed contact of said first selector switch. By adjusting the bridging impedances of the two selector switches to the voltage steps to be bridged by said impedances it is possible to obtain such a ratio between the bridge currents occurring by bridging the fine voltage steps during the fine-step regulation of the voltage and by bridging the great voltage step(s) during the proceeded switching operation that the selector switches can be constructed for switching substantially equal powers and overload of the transformer and the tap changer during the voltage regulating operation is avoided.

A very simple construction of the tap changer is possible if the rotatable switching contacts of the two selector switches are fastened to a common driving shaft.

If the continued switching operation from the highest to the lowest and from the lowest to the highest value of the regulation range can not be made in one single step, since the tap changer then would have to change over a too large power, it is possible to provide the composite tap changer for a regulating transformer comprising a base winding and a regulating winding connected permanently with said base winding and having tappings for the fine voltage steps with a second selector switch which is provided with more than two fixed contacts, each one of which lying between the first and the last fixed contact being electrically conductively connected with a fixed contact of the first selector switch corresponding with the division of said regulating winding into a number of equal or substantially equal voltage steps which is defined by the number of fixed contacts of the second selector switch.

For a regulating transformer comprising a base winding and a regulating winding having tappings for the fine voltage steps, said tap changer including a change-over switch which is provided with a movable contact adapted to be connected with the end of said base winding and two fixed contacts each adapted to be connected with an individual end of said regulating winding, said change-over switch thereby being able to connect said regulating winding alternately in concurrence with or in opposition to said base winding, that means for a transformer with a plus- and minus-regulation, the tap changer may be provided with a second selector switch having three fixed contacts, of which the middle one is electrically conductively connected with the movable contact of said change-over switch.

If the composite tap changer is used in a regulating transformer comprising a base winding provided with an end tapping, one or more additional windings connected in series with said base winding and each provided with an individual end tapping, said additional windings being used for one or more coarse voltage steps, and a regulating winding having tappings for the fine voltage steps, said tap changer including a single or multiple change-over switch adapted to connect the starting end of said regulating winding alternately with said end tappings, the second selector switch may be provided between its first and its last fixed contact with a number of intermediate fixed contacts which is equal to the number of the windings for the coarse voltage steps, said intermediate fixed contacts being each connected, during the continued rotation of the tap changer, with a fixed contact of said change-over switch, each fixed contact of the latter switch being adapted to be connected with the end tapping of an individual winding for the coarse voltage steps. The proceeded switching operation from the highest to the lowest or from the lowest to the highest voltage value of the transformer then takes place, with the aid of the second selector switch and the bridging impedance cooperating therewith, over voltage steps corresponding to the voltages produced by the entire regulating winding and the winding(s) for the coarse voltage step(s).

The invention will be elucidated with the aid of the drawing which illustrates in a diagrammatic way a number of different composite tap changes constructed in accordance with the invention and used for continued switching from the lowest to the highest value of the regulation range of a regulating transformer to energize an electrode or resistance furnace or for the continued switching from the highest to the lowest value of the regulation range. In the drawing show FIGS. 1–4 different positions of a composite tap changer with linear regulation and direct change-over from the lowest to the highest voltage value, FIGS. 5–7 different positions of a composite tap changer with linear regulation and change-over from the lowest to the highest voltage value in two steps.

The tap changer shown in FIGS. 1, 2, 3 and 4 comprises a first selector switch having seven equal fixed contacts 1, 2, 3, 4, 5, 6, 7 which are positioned in a cylindrical surface in an arc of 270° increased by the length of arc of one fixed contact, said cylindrical surface having the axis 8. Cooperating with these fixed contacts are two mechanically coupled switching contacts 9, 10 which are mounted for rotation about said axis 8, one of said switching contacts being directly connected and the other one thereof being connected through a bridging impedance 11 with a point of junction lying in the axis 8. The angular distance between the two rotatable switching contacts 9, 10 and the length of arc of the contact surfaces of the fixed contacts are chosen such, that, during the switching operation, each time two consecutive fixed contacts are interconnected by the rotatable switching contacts 9, 10 and the bridging impedance 11. The fixed contacts 1–7 are connected to the tappings of a regulating winding 12 for six equal voltage steps of a transformer, said regulating winding being permanently connected to the end of a base winding 13 of said transformer to obtain a linear voltage regulation.

Cooperating with said first selector switch is a second selector switch which consists of two fixed contacts, 14, 15, two rotatable switching contacts 16, 17 and a bridging impedance 18. The two fixed contacts 16, 17 are positioned in an arc of 90° increased with the arc of length of a fixed contact of the first selector switch. The contact surface of the fixed contact 14 extends through an arc of 45° increased with the length of arc of a fixed contact of the first selector switch. The fixed contact 15 is equal to the fixed contacts of the first selector switch. The rotatable switching contacts are interconnected through the bridging impedance 18 in a point of junction lying in the axis 19 and they are fastened to the same driving shaft as the rotatable switching contacts 9, 10 of the first selector switch, so that all rotatable switching contacts of this composite tap changer are positively coupled with one another.

The points of junction of the rotatable switching contacts of both selector switches are connected to a network or starpoint conductor 20. The fixed contacts 14, 15 of the second selector switch are connected with the fixed contacts 7 and 1 of the first selector switch, respectively. In the given embodiment the rotatable switching contacts of the tap changer are driven in the direction indicated by the arrows 21.

Figure 1:
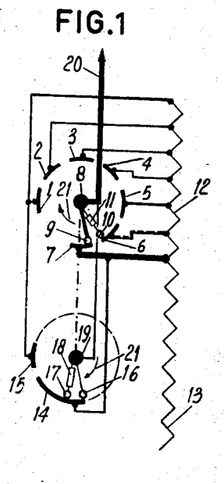
Figures 2, 3:
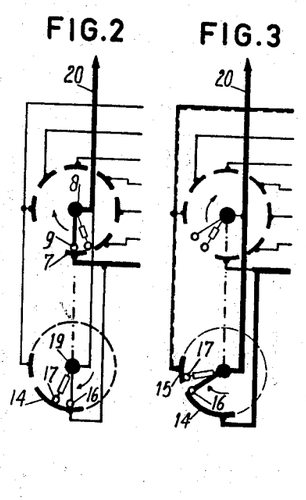
Figure 4:
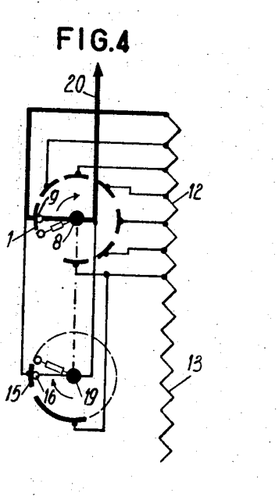

In the position of the tap changer shown in FIG. 1 the first voltage step of the regulating winding is bridged by the bridging impedance 11, so that a bridge current flows through the fixed contacts 6, 7, the rotatable switching contacts 9, 10 and the impedance 11. At the same time the network or starpoint conductor 20 is connected with the end of the base winding 13 and the beginning of the regulating winding 12, so that this conductor is connected to the lowest voltage value of the transformer. When the switching contacts are rotated on, first the bridging of the first voltage step is eliminated (FIG. 2) and thereupon the entire regulating winding 12 is shunted by the impedance 18 of the second selector switch, so that a bridge current flows through said selector switch, while the switching contacts 9, 10 of the first selector switch are both out of contact with the fixed contact of said first switch (FIG. 3). Finally the conductor 20 is connected with the free end of the regulating winding 12, so that it is fed by the highest voltage value of the transformer (FIG. 4). If the tap changer is rotated still further the conductor 20 will be returned successively past all voltage steps of the regulating winding to the lowest voltage value.

This tap changer may be used in cooperation with a transformer to feed an electrode- or resistance-furnace, in which scrap metal or ore is melted. The more scrap or ore becomes fused the lower the resistance thereof becomes so that the voltage must be reduced.

If the tap changer is rotated in the opposite direction the reverse happens. The voltage fed to the conductor 20 is then increased stepwise by the first selector switch and after having reached the highest value it is directly returned to the lowest value by the second selector switch.

The ratio between the bridging impedance 18 and the bridging impedance 11 can be so chosen as to guarantee that the bridge currents are about equal in all intermediate positions of the tap changer.

Figure 5:
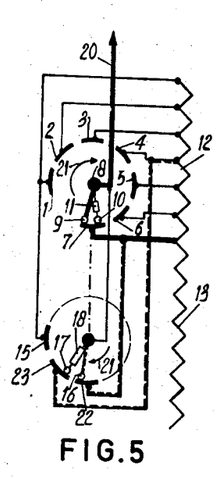
Figure 6:
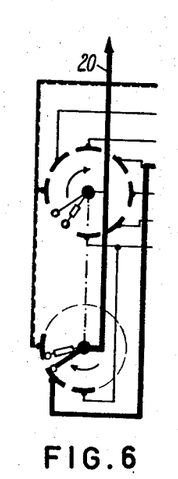
Figure 7:
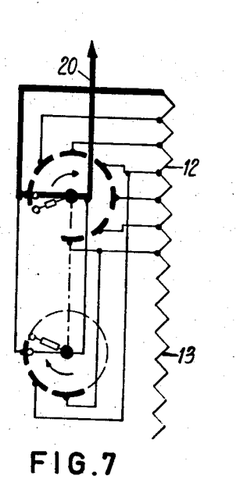

The tap changer shown in FIGS. 5, 6 and 7 differs from that illustrated in FIGS. 1–4 in that the second selector switch is provided with three fixed contacts 22, 23, 15 having the same length of arc as that of the fixed contacts of the first selector switch and arranged in the arc of 90° increased with the length of arc of one fixed contact. The middle fixed contact 23 of the second switch is connected with the middle fixed contact 4 of the first selector switch.

FIGS. 5, 6 and 7 show the positions of the tap changer during the continued rotation thereof from the lowest to the highest voltage value of the transformer. It will be apparent that in this case the bridging impedance 18 of the second selector switch will be shunted twice to half the regulating winding 12, so that during the continued switching operation will be less loaded and the impedance can be made smaller than that of the impedance 18 of the tap changer shown in FIGS. 1–4. It is also possible to use more than one intermediate step in the continued switching operation.

FIGS. 8, 9, 10 and 11 relate to a composite tap changer for the so-called plus- and minus-regulation. Therein the regulation winding 12 is connected alternately in concurrence with and in opposition to the base winding 13, so that the regulation range is doubled. The two selector switches of this tap changer correspond with those of the tap changer shown in FIGS. 5–7. In addition the tap changer includes a change-over switch provided with two fixed contacts 24, 25 and a movable contact 26. The regulating winding 12 is not connected directly with the base winding 13 any more. The free end of the base winding is connected both to the middle contact 23 of the second selector switch and to the movable contact 26 of said change-over switch, whereas the fixed contacts 24, 25 of the change-over switch are connected with the fixed contacts 22 and 15 of the second selector switch and the fixed contacts 7 and 1 of the first selector switch, respectively.

Figure 8:
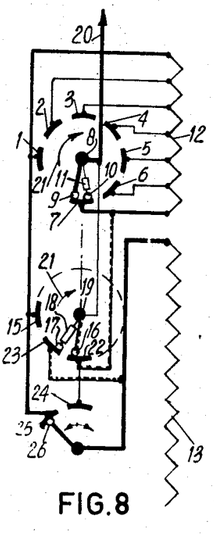
FIGS. 8–11 different positions of a composite tap changer with plus- and minus-regulation and change-over from the lowest to the highest voltage value in two steps.
Figure 9:
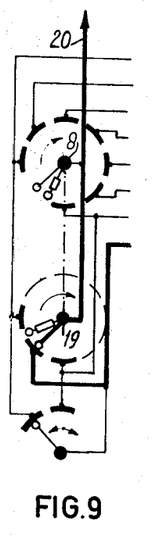
Figure 10:
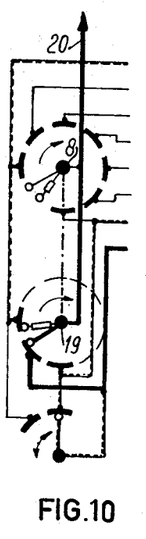
Figure 11:
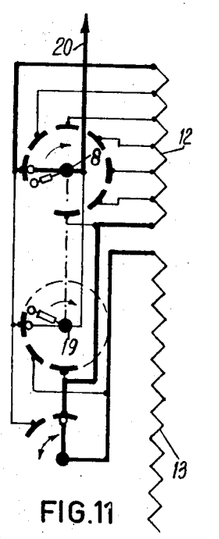

In FIG. 8 the tap changer is in a position, in which the conductor 20 is connected with the lower end of the regulating winding 12, when the latter is in opposition to the base winding 13, so that said conductor is fed with the lowest voltage value. Moreover, the entire regulating winding 12 is shunted by the impedance 18 through the change-over switch and the second selector switch. If the tap changer continues to rotate the conductor 20 is connected to the end of the base winding 13, that means to the centre of the regulation range, and said shunt is eliminated (FIG. 9). As soon as this position has been reached the change-over switch is changed-over at zero-load, so that it will come into the position as shown in FIGS. 10 and 11, in which the regulating winding 12 is connected in the same direction as the base winding 13. If the tap changer continues to rotate the regulating winding 12 is again shunted by the impedance 18, while the conductor 20 is left connected to the end of the base winding 13 (FIG. 10). Thereafter this shunt is eliminated and the conductor 20 is connected with the upper end of the regulating winding, that means with the highest voltage value of the transformer (FIG. 11). If the tap changer continues to rotate in the direction of the arrows 21 the voltage fed to the conductor 20 is lowered stepwise with the voltage steps of the regulating winding 12. After having reached the lower end of the regulating winding the conductor 20 is connected with the base winding by the second selector switch, whereafter first the change-over switch is changed-over at zero-load, so that the winding 12 is again connected in opposition to the base winding. Thereupon the conductor 20 is connected with the upper end of the winding 12 by the first selector switch. At further rotation of the tap changer the voltage fed to the conductor 20 is still further lowered stepwise with the voltage steps of the regulating winding now connected in opposition till the lowest voltage value of the transformer that means the situation shown in FIG. 8, has again been reached. This transformer has 6+6=12 voltage steps.

The tap changer illustrated in FIGS. 12, 13, 14, 15, 16, 17, 18 and 19 corresponds to that shown in FIGS. 8–11. The only difference is, that the tap changer is adapted to cooperate with a transformer operating with one coarse and six fine voltage steps, that means with a transformer provided with a base winding 13, a winding 27 for the coarse voltage step connected in series with said winding 13 and a separate winding 12 for the fine voltage steps. To that end and contrary to what is shown in FIGS. 8–11 the fixed contact 22 of the second selector switch is connected with the movable switching contact 26 of the change-over switch, the middle fixed contact 23 of the second selector switch is connected both to the fixed contact 25 of the change-over switch and to the free end of the winding 27 for the coarse voltage step, whereas the fixed contact 24 of the change-over switch is connected with the end of the base winding 13.

Figures 12, 13:
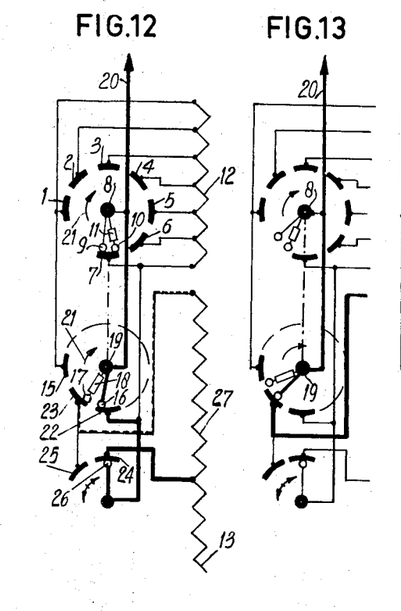
FIGS. 12–19 different positions of a composite tap changer for a transformer having one coarse and six fine voltage steps said tap changer being adapted to change-over from the lowest to the highest voltage value in two steps and FIGS. 20–37 different positions of a composite tap changer for a transformer having two coarse and five fine voltage steps, said tap changer being adapted to change-over from the highest to the lowest voltage value in three steps.
Figure 14:
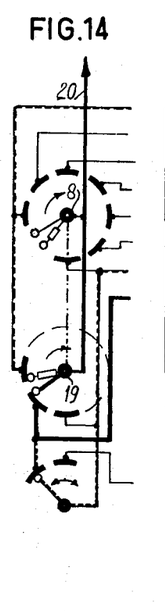
Figure 15:
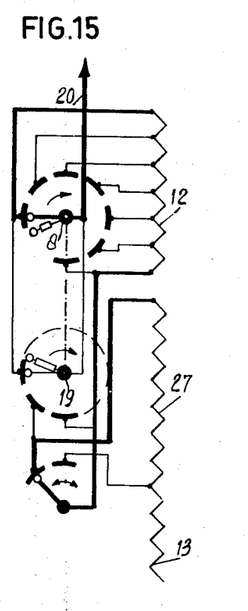
Figures 16, 17:
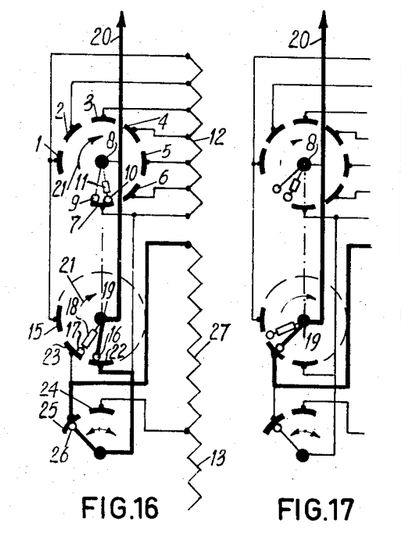
Figure 18:
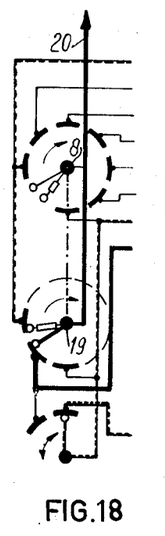
Figure 19:
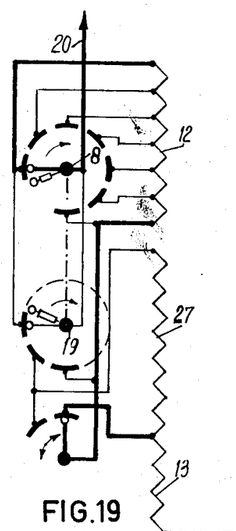

In FIG. 12 the conductor 20 is connected through the second selector switch and the change-over switch with the end of the base winding, that means with the lowest voltage value of the transformer, and the winding 27 for the coarse voltage step is shunted by the impedance 18 of the second selector switch. In the next position (FIG. 13) said shunt is eliminated and the conductor 20 is connected with the free end of the winding 27. As soon as this position has been reached, the change-over switch is changed-over at zero-load to the contact 25, so that the winding 12 for the fine voltage steps is connected to the free end of the winding 27. A short while thereafter the winding 12 is bridged by the impedance 18 (FIG. 14), after which said bridging is eliminated and the conductor 20 is connected by the first selector switch to the upper end of the winding 12, that means to the highest voltage value of the transformer (FIG. 15). If the tap changer continues to rotate the voltage fed to the conductor 20 is stepwise lowered with the fine voltage steps of the winding 12 till the position shown in FIG 16 has been reached. In this position the conductor 20 is connected through the second selector switch and the change-over switch with the free end of the winding 27 and the regulating winding 12 is out of operation. At further rotation of the tap changer the change-over switch is made currentless (FIG. 17), so that it can be returned to the contact 24, whereby the winding 12 for the fine voltage steps is connected with the end of the base winding. A short while later the winding 12 is shunted by the impedance 18 (FIG. 18), whereupon said conductor is connected by the first selector switch to the upper end of the winding 12 which is then connected through the change-over switch with the base winding 13 (FIG. 19). During the next revolution of the tap changer the voltage fed to the conductor 20 is further lowered stepwise with the voltage steps of the winding 12 till the position shown in FIG. 12 has again been reached and the conductor 20 has the lowest voltage. Since the winding 27 produces a voltage which is one fine voltage step higher than the voltage produced by the entire winding 12 the transformer has 6+7=13 voltage steps.

It need not be observed that, when the tap changers according to the embodiments shown are rotated in the opposite direction, the voltage fed to the network or star-point conductor 20 is first increased stepwise from the lowest to the highest voltage value and at continued rotation of the tap changer is returned from the highest to the lowest voltage value in one or two steps.

The tap changer shown in FIGS. 20–37 is meant for a regulating transformer comprising a base winding 13, two windings 27, 28 for the coarse voltage steps connected in series with the winding 13 and a separate regulating winding 12 for the fine voltage steps. To this end the tap changer is provided with a first selector switch having six fixed contacts 1–6 for five fine voltage steps, a second selector switch having mounted between its first fixed contact 22 and its last fixed contact 15 as many fixed contacts 29, 30 as there are windings 27, 28 for the coarse voltage steps and a multiple change-over switch. This multiple change-over switch consists of a first change-over switch having a rotatable switching contact 26 and three fixed contacts 24, 25 and 31 connected to the end tappings of the windings 13, 27 and 28, a second change-over switch having a rotatable switching contact 32 and three fixed contacts 33, 34 and 35, of which the contact 33 is connected with the end tapping of the winding 27 and the contacts 34 and 35 are both connected to the end tapping of the winding 28, a third change-over switch having two rotatable switching contacts 36, 37 operating as bridging contact and three fixed contacts 38, 39, 40, of which the contacts 38 and 40 are both connected with the fixed contact 29 and the contact 39 is connected with the fixed contact 30 of the second selector switch, and a fourth change-over switch having a rotatable switching contact 41 and a fixed contact 42 which is also connected with the fixed contact 30 of the second selector switch. All rotatable switching contacts 26, 32, 36, 37, 41 of the multiple change-over switch are fastened on a common driving shaft. The rotatable switching contact 26 is connected to the fixed contacts 1 and 15 of the selector switches, that means it is connected with the beginning or starting end of the regulating winding 12. The rotatable switching contacts 32, 36 and 37 are interconnected and the rotatable switching contact 41 is connected to the end tapping of the winding 27. The selector switches on one hand and the switches of the multiple change-over switch on the other hand are driven according to different programmes.

Figure 20:
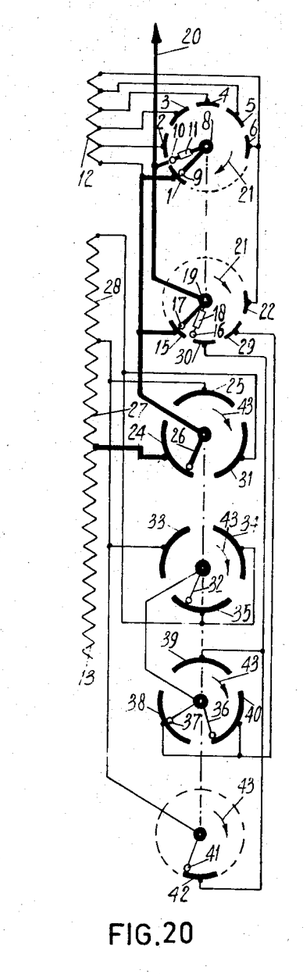
Figure 21:
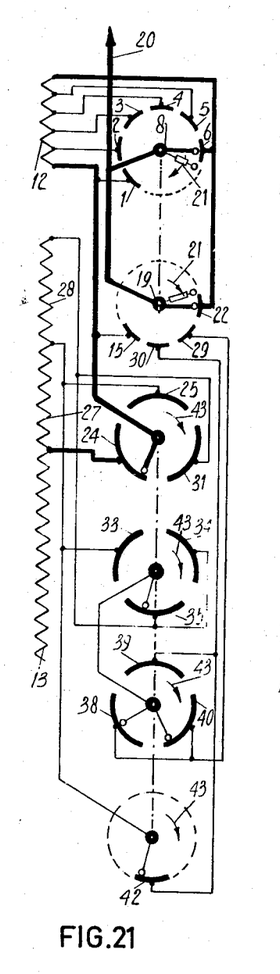

In FIG. 20 the network or starpoint conductor 20 is connected through the two selector switches and the first change-over switch with the end tapping of the base winding, so that the conductor 20 is fed with the lowest voltage value of the transformer. If the selector switches are rotated in the direction of the arrow 21 the voltage of the conductor 20 is stepwise increased with the fine voltage steps till the entire regulating winding 12 is connected in series with the base winding 13 (FIG. 21). During this stepwise increase of the voltage of conductor 20 or immediately thereafter the change-over switches are rotated in the positions shown in FIG. 22. It is observed, that the second, the third and the fourth change-over switch, of which the rotatable switching contacts during this rotation are separated from fixed contacts, do not conduct current, so that in the multiple change-over switch no interruption of current takes place.

Figure 22:
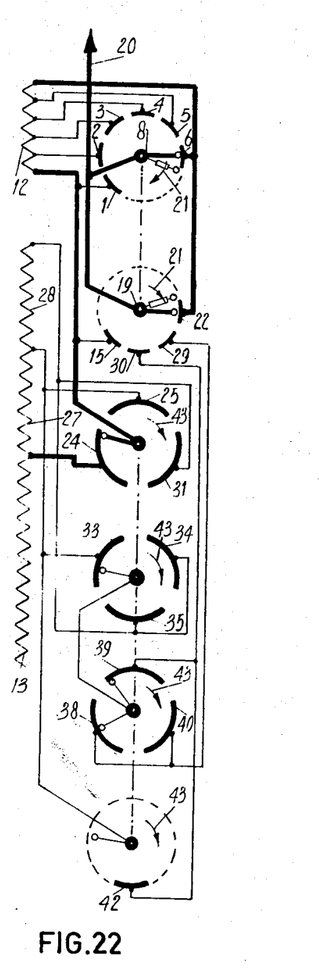
Figure 23:
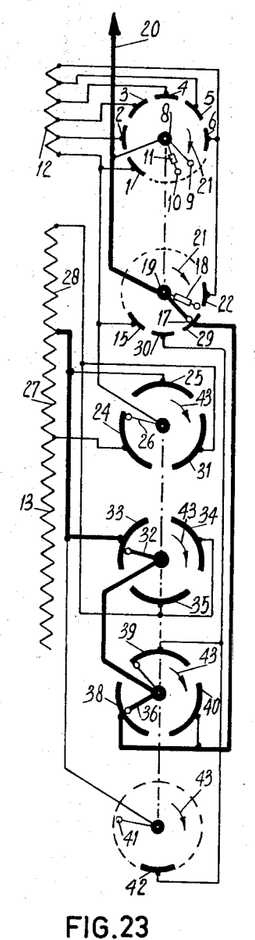
Figure 24:
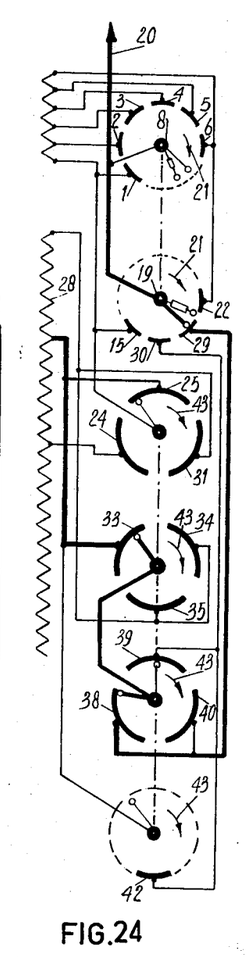

After having reached the position shown in FIG. 22 the selector switches continue to rotate and the conductor 20 is connected through the second selector switch and the third and the second change-over switch to the end tapping of the winding 27 (FIG. 23). The voltage of this end tapping is one fine voltage step higher than that of the base winding 13 and the regulating winding 12 connected in series therewith, since the voltage across the winding 27 is equal to six fine voltage steps. Thereafter the change-over switches are placed without any interruption of current into the position shown in FIG. 24, in which the conductor 20 is connected through the second selector switch and the third and the second change-over switch with the end tapping of the winding 27.

Figure 25:
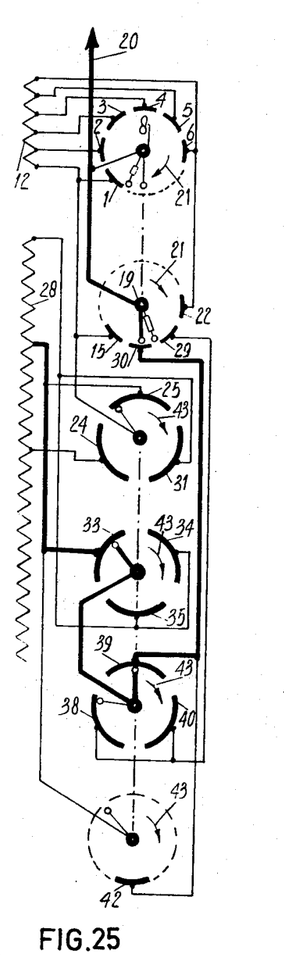
Figure 26:
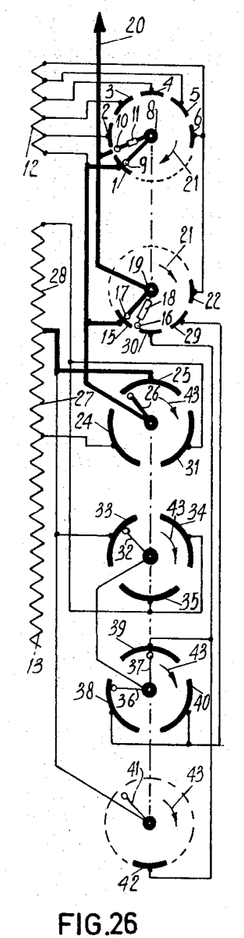
Figure 27:
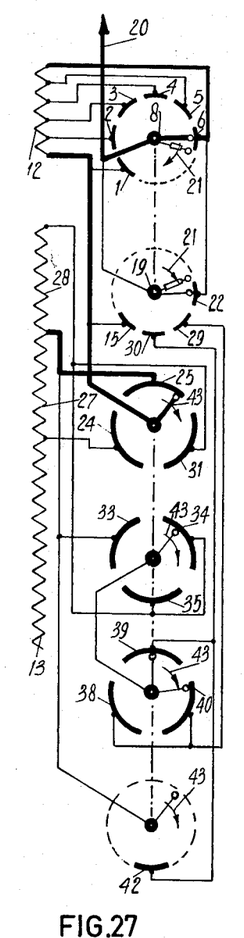

During further rotation of the selector switches the position shown in FIG. 25 is passed and the position shown in FIG. 26 is reached, in which the conductor and the starting end of the regulating winding 12 are connected through both selector switches and the first change-over switch with the end tapping of the winding 27. Thereupon the voltage of the conductor 20 is again increased stepwise with the fine voltage steps of the regulating winding 12 till the position shown in FIG. 27 has been reached. During this stepwise increase of the voltage or immediately thereafter the change-over switches are rotated on without interruption of current and placed in the positions shown in FIG. 27.

Figure 28:
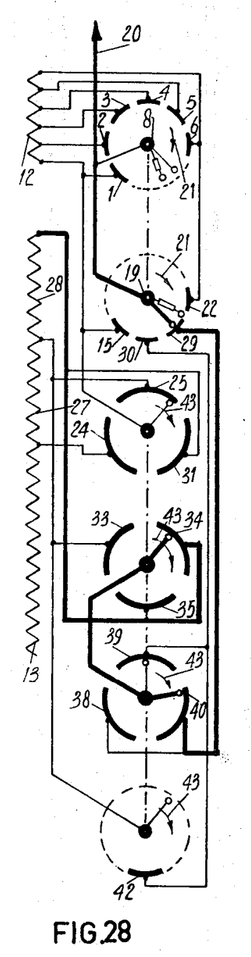
Figure 29:
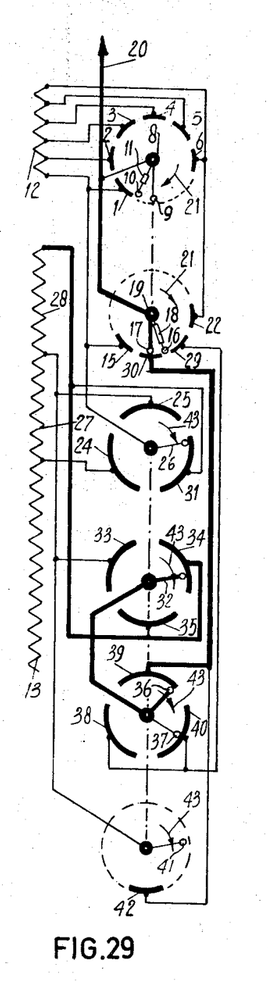
Figure 30:
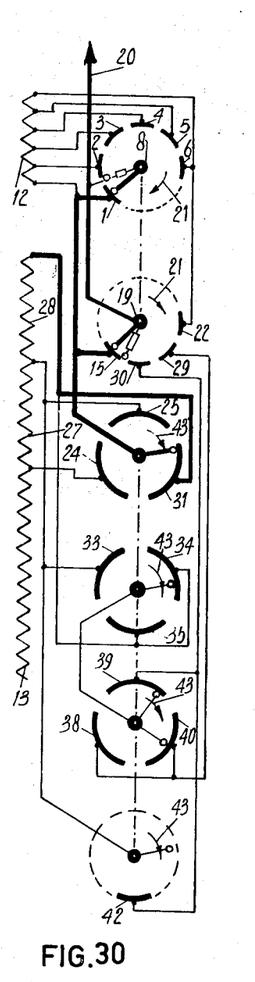
Figure 31:
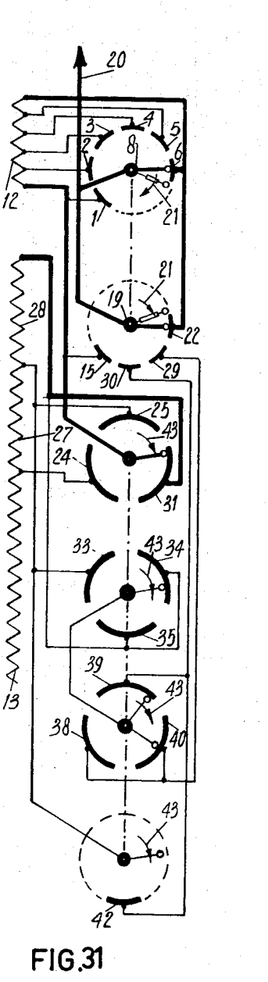
Figure 32:
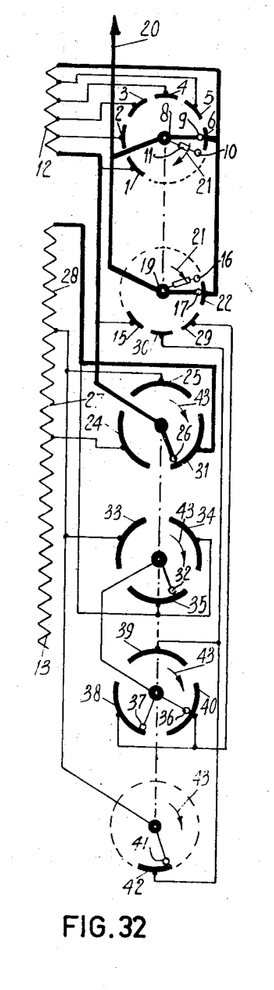
Figure 33:
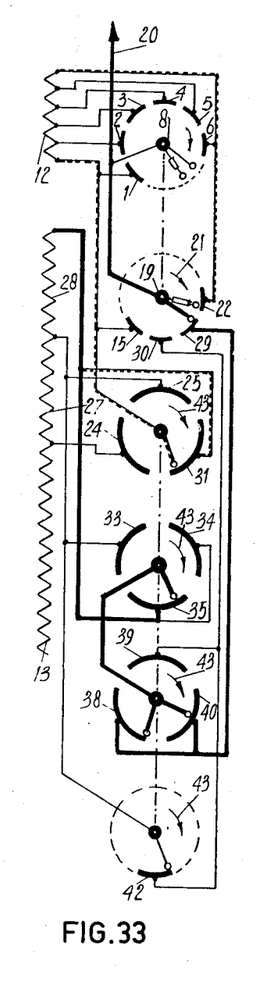

If the selector switches are rotated for the second time the positions shown in FIG. 28 and FIG. 29 are successively passed, in which the conductor 20 is connected through the second selector switch and the third and the second change-over switch to the end tapping of the second winding 28 for a coarse voltage step. Also this winding 28 produces a voltage which is equal to six fine voltage steps. At the same time the change-over switches are rotated on, which is effected without current interruption, till they have reached the positions shown in FIG. 29. Further rotation of the selector switches takes them to the positions shown in FIG. 30, in which the conductor 20 and the starting end of the regulating winding 12 are connected through the selector switches and the first change-over switch with the end tapping of the winding 28. Thereafter the voltage fed to the conductor 20 is increased for the third time with the fine voltage steps of the regulating winding, when the selector switches continue to rotate, till the position shown in FIG. 31 has been reached, in which the voltage of the conductor 20 has the highest possible value which is 6+6+5=17 fine voltage steps higher than the lowest voltage value in the starting position shown in FIG. 20.

Figure 34:
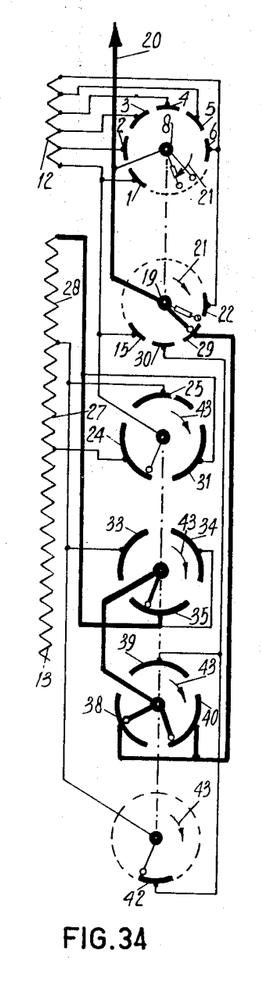
Figure 35:
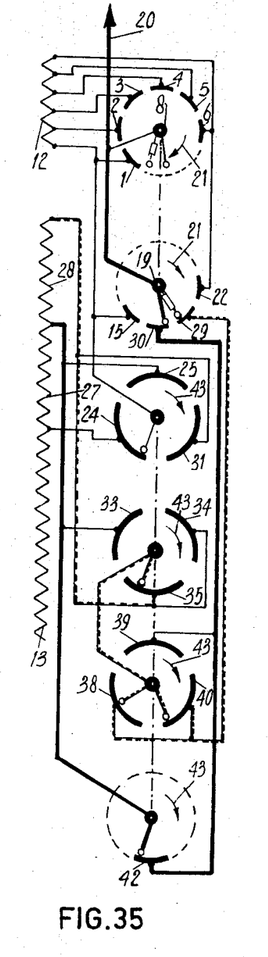
Figure 36:
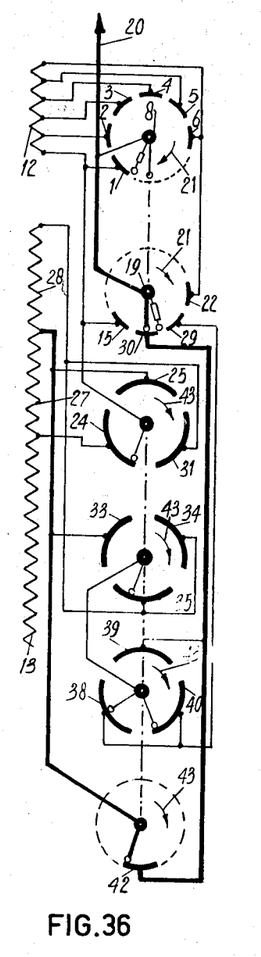
Figure 37:
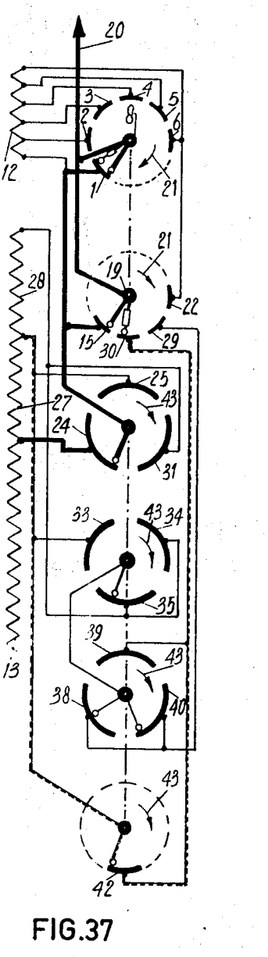

After having reached the highest voltage value the conductor 20 can be returned quickly to the end tapping of the base winding 13, that means to the lowest voltage value. To that end the change-over switches, are rotated into the position shown in FIG. 32, which is effected without current interruption. Thereafter the selector switches are rotated past the intermediate position shown in FIG. 33, in which the conductor 20 is connected to the end tapping of the winding 28 and the regulating winding 12 is shunted by the bridging impedance 18 of the second selector switch, into the positions shown in FIG. 34 and the change-over switches are placed in their starting positions which are also shown in FIG. 34. In this position of the tap changer the shunt to the regulating winding is eliminated. If the selector switches continue to rotate the intermediate position shown in FIG. 35 is reached, in which the conductor 20 is connected to the end tapping of the winding 27 and the winding 28 is shunted by the bridging impedance 18 of the second selector switch. In the next position (FIG. 36) said shunt is eliminated and the conductor 20 is connected through the second selector switch and the fourth change-over switch with the end tapping of the winding 27. During further rotation of the selector switches the intermediate position shown in FIG. 37 is passed, in which the conductor 20 is connected with the end tapping of the base winding 13 and the winding 27 is shunted by the impedance 18. Finally the position shown in FIG. 20 is again reached. The shunt to the winding 27 is then eliminated and the conductor 20 is again connected with the end tapping of the base winding, that means it is again connected with the lowest voltage value of the transformer.

The return rotation from the highest to the lowest voltage value is thus effected by this tap changer in three steps, viz. the voltage steps defined by the entire regulating winding 12, the winding 28 and the winding 27. These three return steps are equal to five, six and six fine voltage steps.

The composite tap changer shown in FIGS. 20–37 can be easily constructed for a transformer having more than two coarse voltage steps. For *n* coarse voltage steps the second selector switch must be provided between the first and the last fixed contact with *n* intermediate fixed contacts and the first, the second and the third change-over switches must have each 1+*n* fixed contacts.

During the complete switching cycle of the tap changer illustrated in FIGS. 20–37 the selector switches make three complete revolutions and the change-over switches make only one complete revolution in the direction indicated by the arrows 21 and 43. If the tap changer has to rotate on from the lowest to the highest voltage value all switches thereof need only to be rotated in the opposite direction.

What I claim is:

1. A composite tap changer for a regulating transformer, said tap changer comprising at least two switches, of which one is a selector switch operating under load conditions and provided with a series of fixed contacts which are positioned with their contact surfaces in a cylindrical surface and are evenly distributed over a portion of the circumference circle of said cylindrical surface only, said fixed contacts being adapted to be connected with the tapping of a winding of said transformer, and at least two switching contacts which are mounted for rotation about the axis of said cylindrical surface and are mechanically fixed to one another, one of said switching contacts being connected substantially without any resistance and the other one thereof being connected through a bridging impedance with a point of junction adapted to be connected with a network or starpoint conductor which has to be connected to the tappings of said winding, said rotatable switching contacts being adapted to be rotated continuously in either direction of rotation and being positioned at such an angular distance from each other, that, during their rotation past the series of fixed contacts, said switching contacts make and break contact with said fixed contacts one after the other and interconnects each time two consecutive fixed contacts temporarily through said bridging impedance, but, during, their continued rotation from the last to the first fixed contact of said series, said switching contacts are simultaneously temporarily out of cooperation with a fixed contact, characterized in that the second switch is a selector switch of the same type as the first mentioned selector switch, the rotatable switching contacts of said second selector switch being mechanically positively coupled with the rotatable switching contacts of the first selector switch and cooperating with a second bridging impedance, the point of junction of the rotatable switching contacts of said second selector switch being electrically conductively connected with the point of junction of the rotatable switching contacts of the first selector switch, the first and the last contact of the series of fixed contacts of said second selector switch, seen in a direction of rotation of its rotatable switching contacts, being electrically conductively connected with the last and the first contact of the series of fixed contacts of the first selector switch, respectively, seen in the corresponding direction of rotation of the rotatable switching contacts of said first selector switch and the fixed and the rotatable contacts of the two selector switches being so arranged in relation to each other as to ensure that the transition of the connection to be established between said points of junction and a fixed contact from a fixed contact to the next fixed contact is exclusively carried out by the rotatable switching contacts and the bridging impedance of the first selector switch, when the rotatable switching contacts of said first selector switch rotate from the first to the last fixed contact of said selector switch, and is exclusively carried out by the rotatable switching contacts and the bridging impedance of the second selector switch, when the rotatable contacts of the first selector switch continue to rotate from the last to the first fixed contact of said first selector switch.

2. A composite tap changer according to claim 1, characterized in that the rotatable switching contacts of the two selector switches are fastened to a common driving shaft.

3. A composite tap changer according to claim 1 for a regulating transformer comprising a base winding and a regulating winding connected permanently with said base winding and provided with tappings for the fine voltage steps, characterized in that the second selector switch is provided with more than two fixed contacts, each one of which lying between the first and the last fixed contact being electrically conductively connected with a fixed contact of the first selector switch corresponding with the division of said regulating winding into a number of equal or substantially equal voltage steps which is defined by the number of fixed contacts of the second selector switch.

4. A composite tap changer according to claim 1 for a regulating transformer comprising a base winding and a regulating winding provided with tappings for the fine voltage steps, said tap changer including a change-over switch which is provided with a movable contact adapted to be connected with the end of said base winding and two fixed contacts each adapted to be connected with an individual end of said regulating winding, said change-over switch thereby being able to connect said regulating winding alternately in concurrence with or in opposition to said base winding, characterized in that said second selector switch is provided with three fixed contacts, of which the middle one is electrically conductively connected with the movable contact of said change-over switch.

5. A composite tap changer according to claim 1 for a regulating transformer comprising a base winding provided with an end tapping, one or more additional windings connected in series with said base winding and each provided with its own end tapping, said additional windings being used for one or more coarse voltage steps, and a regulating winding provided with tappings for the fine voltage steps, said tap changer including a single or multiple change-over switch adapted to connect the starting end of said regulating winding alternately with said end tappings, characterized in that the second selector switch is provided between its first and its last fixed contact with a number of intermediate fixed contacts which is equal to the number of the windings for the coarse voltage steps, said intermediate fixed contacts being each connected during the continued rotation of the tap changer, with a fixed contact of said change-over switch, each fixed contact of the latter switch being adapted to be connected with the end tapping of an individual winding for the coarse voltage steps.

References Cited
UNITED STATES PATENTS

| | | | |
|---|---|---|---|
| 2,231,627 | 2/1941 | Jansen | 200—11X(TC) |
| 2,786,122 | 3/1957 | Strain | 323—43.5X |
| 3,194,900 | 7/1965 | Bleibtreu | 323—43.5X |
| 3,244,966 | 4/1966 | Gertsch et al. | 323—43.5 |

FOREIGN PATENTS

| | | | |
|---|---|---|---|
| 286,652 | 10/1952 | Switzerland | 323—43.5 |

J D MILLER, Primary Examiner

A. D. PELLINEN, Assistant Examiner

U.S. Cl. X.R.

200—11